E. M. ROSENBLUTH.
ACETYLENE GAS GENERATOR.
APPLICATION FILED JAN. 12, 1907.
916,024.
Patented Mar. 23, 1909.
3 SHEETS—SHEET 2.
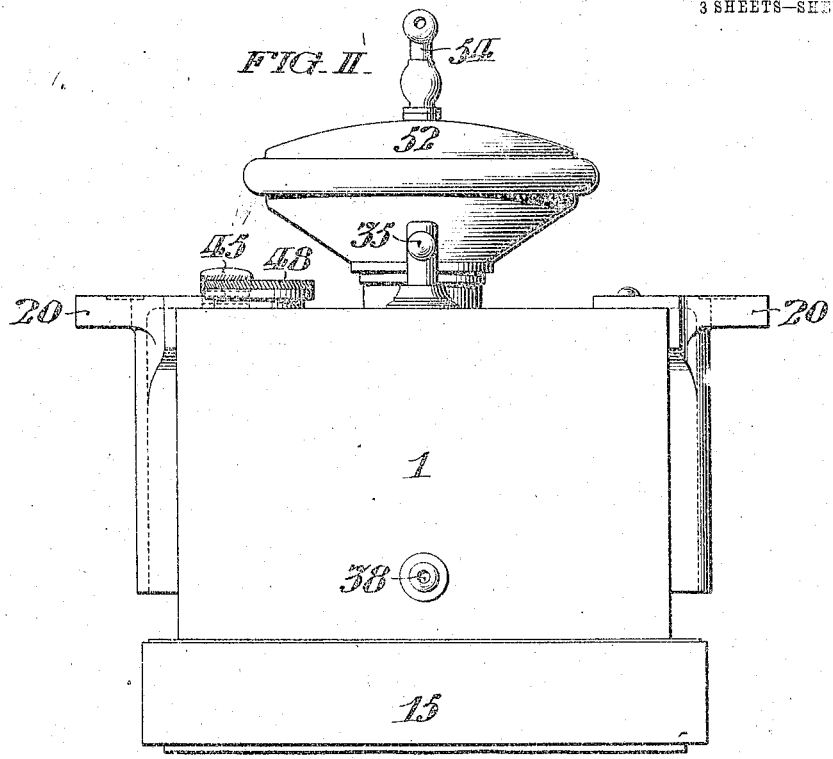
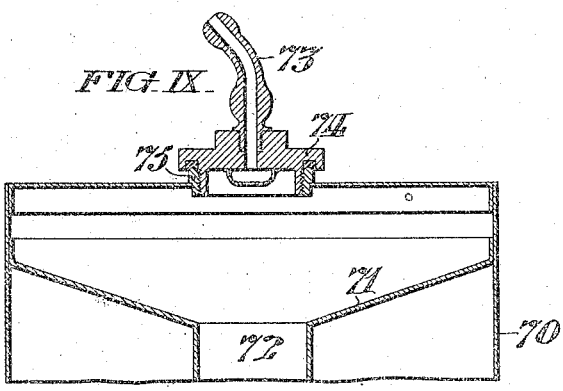
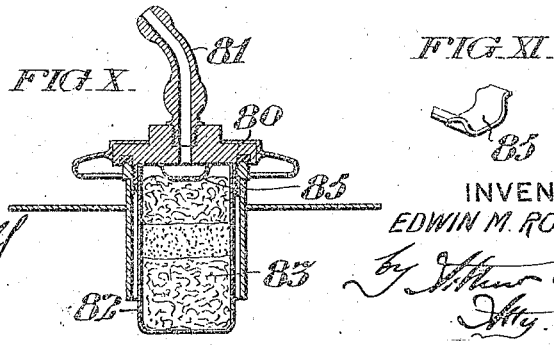
WITNESSES:
Clifton C. Hallowell
Thomas W. Kerr
INVENTOR:
EDWIN M. ROSENBLUTH,
by Arthur E. Paige
Atty.

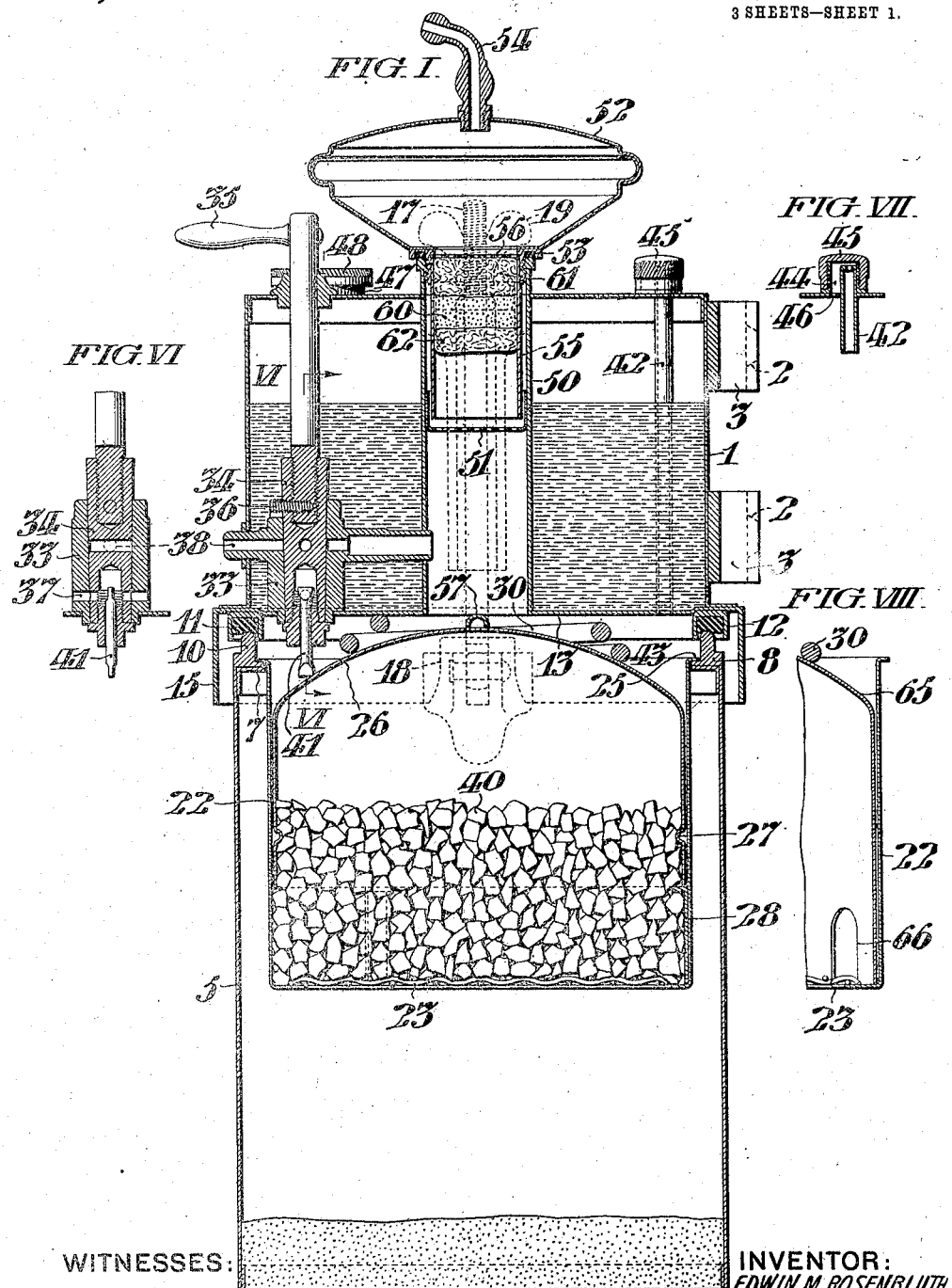

E. M. ROSENBLUTH.
ACETYLENE GAS GENERATOR.
APPLICATION FILED JAN. 12, 1907.
916,024.
Patented Mar. 23, 1909.
3 SHEETS—SHEET 3.
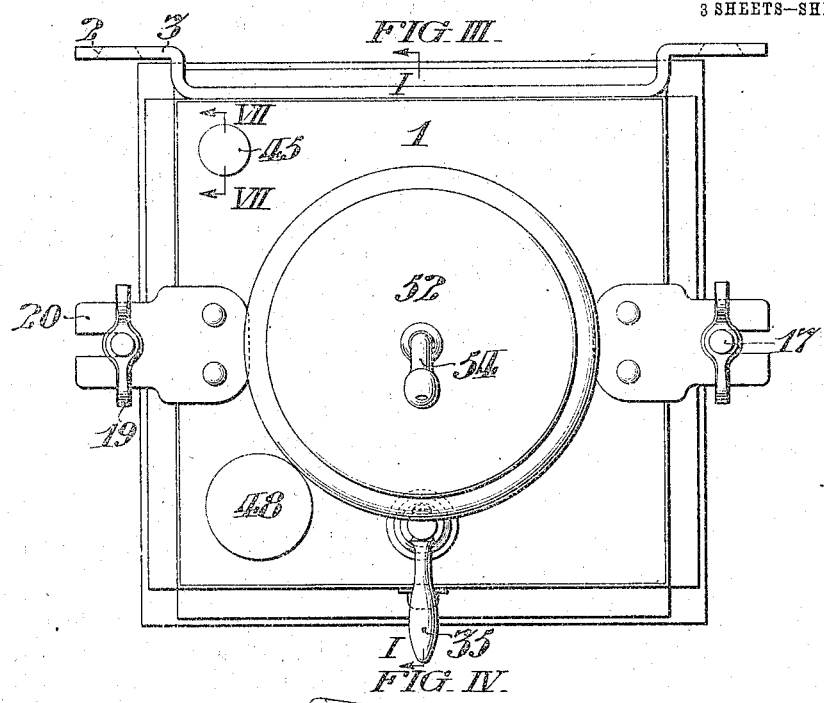
FIG. III.
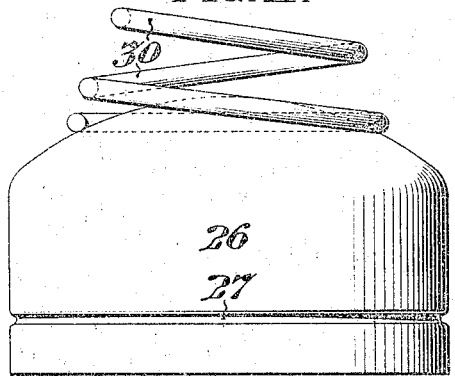
FIG. IV.
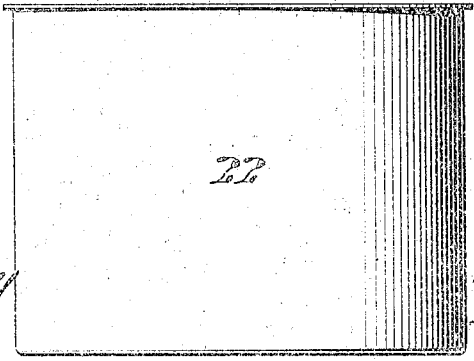
FIG. V.
WITNESSES:
Clifton C. Hallowell
Thomas H. Kerr
INVENTOR:
EDWIN M. ROSENBLUTH,
by Arthur E. Paige
Atty.

UNITED STATES PATENT OFFICE.

EDWIN M. ROSENBLUTH, OF PHILADELPHIA, PENNSYLVANIA.

ACETYLENE-GAS GENERATOR.

No. 916,024.   Specification of Letters Patent.   Patented March 23, 1909.

Application filed January 12, 1907. Serial No. 351,960.

*To all whom it may concern:*

Be it known that I, EDWIN M. ROSENBLUTH, of the city of Philadelphia and State of Pennsylvania, have invented a certain new and useful Improvement in Acetylene-Gas Generators; whereof the following is a specification, reference being had to the accompanying drawings.

My improvement relates to that class of generators wherein the water chamber is in superimposed relation to the carbid receptacle and the water gravitates to the carbid.

It is the object of my invention to provide such a generator with means arranged to evenly distribute the water to the periphery of the carbid mass; and to terminate the supply of gas to the burner contemporaneously with the termination of the supply of water.

The form of my invention hereinafter described comprises a water receptacle having supporting means, a carbid casing removably secured in subjacent relation to said water receptacle and inclosing a carbid receptacle, a dome shaped cap loosely fitted within said receptacle, over the carbid, and a valve having a gas passage and a water passage, the latter passage being restricted and arranged to direct water onto said cap; said valve being so arranged that when the water passage is closed the gas passage is contemporaneously opened to connect the gas chamber with the atmosphere and permit the escape of the surplus gas produced by "after generation."

My invention comprises the various novel features of construction and arrangement hereinafter more definitely specified.

In the accompanying drawings, Figure I is a central vertical section of a generator constructed in accordance with my invention, taken on the line I, I, in Fig. III. Fig. II, is a side elevation of the water receptacle as seen from the left of Fig. I. Fig. III, is a plan view of said generator. Fig. IV, is a side elevation of the domed cap for the carbid receptacle. Fig. V, is a side elevation of the carbid receptacle. Fig. VI, is a central vertical section of the valve taken on the line VI, VI in Fig. I. Fig. VII, is a central vertical section of the vacuum relief passage taken on the line VII, VII in Fig. III. Fig. VIII, is a fragmentary sectional view of a modified form of cap for the carbid receptacle. Figs. IX, and X are central vertical sections of modified forms of condensers.

Fig. XI, is a perspective view of the shield shown in Fig. X.

In said figures, the water receptacle 1, is arranged to be supported from a vertical wall, to which it may be rigidly attached by screws extending through suitable apertures 2, in the supporting brackets 3, best shown in Fig. III. Subjacent to said water receptacle 1, and secured thereto in removable, gas tight relation is the carbid casing 5, which comprises an inwardly turned flange 7, upon which is secured the annular ring 8, comprising the upwardly extending flange 10, arranged to engage the annular rubber gasket 11. Said gasket 11, is conveniently seated within the channeled ring 12, which is secured to the underside of the bottom wall 13 of the water receptacle 1. As best shown in Fig. I, the bottom wall 13, extends slightly beyond the channeled ring 12, and terminates in the depending flange 15, which conveniently conceals the joint between said water receptacle and carbid casing.

The carbid casing 5, is arranged to be secured to the water receptacle 1, by the swing bolts 17, which are pivoted in the brackets 18, on said casing, and provided with wingnuts 19, in threaded engagement with their free ends. As best shown in Fig. III, the swing bolts 17, are arranged to be received between the forks of the bifurcated brackets 20, which are carried by the water receptacle 1, and against which the wing-nuts 19 are arranged to bear, and by their rotation to hermetically close the joint between the water receptacle and carbid chamber.

The carbid receptacle 22, is conveniently suspended within the carbid casing 5, and comprises the foraminous floor 23 through which the ashes precipitate to the bottom of said carbid casing 5, the upper edge of said receptacle being provided with the flange 25, arranged to engage the ring 8, whereby it is supported. Said carbid receptacle 22, is provided with a removable dome shaped cap 26, arranged to fit loosely therein, and has an inwardly extending rib 27, formed by rolling a bead parallel with its lower edge. As shown in Fig. I, said lower edge rests upon the brackets 28, which are conveniently secured within the carbid casing 5, to uphold said cap 26, against the compression of the spiral spring 30, which is carried thereby. Said water receptacle is provided with a valve 33, whose plug 34, comprises a handle 35, exterior to said receptacle, whereby said plug is rotated; a stop pin 36, arranged to limit its movement; and independent passages 37 and 38, for water and gas respectively. The water passage 37, includes a restricted water outlet, opening into the carbid receptacle 22, and arranged to direct the water onto the dome of the cap 26, from whence it trickles down in a thin film, between the side walls of said cap and carbid receptacle, to the carbid 40, contained therein. Said aperture is conveniently restricted by the reciprocatory plunger 41, which extends therethrough and by which it may be freed from any obstruction which may lodge therein and permit the water to gravitate in a film through the annular passageway between the plunger and the walls of the aperture.

In order to facilitate the free flow of the water from the water receptacle 1, when the valve is opened, a vacuum relief tube 42 extends from the gas chamber 43, into the inclosure 44, which is conveniently provided with the screw cap 45, and which communicates with the interior of the water receptacle 1, through the aperture 46, in its top wall. Said water receptacle 1, is provided with a filler 47, through which it may be charged, and said filler is normally closed by the screw cap 48.

The gas generated in the carbid receptacle escapes into the chamber 43 between the receptacle 22 and the cap 26, and is conveyed therefrom through the centrally disposed tube 50, extending through the water receptacle, and comprising the perforated diaphragm 51. Said tube 50 terminates slightly above the upper wall of the water receptacle and is arranged to support the condenser 52, which is in threaded engagement with the tube 50, and is rendered gas tight by the gasket 53. Said condenser also conveniently serves as a knob or handle by which the generator may be carried, and is provided with the elbow nozzle 54, arranged to be connected with a burner by a flexible conduit (not shown) but which may be conveniently slipped over said nozzle. Said condenser is provided with a tubular extension which forms a filter casing 55, depending within the tube 50, and comprising a perforated diaphragm 56, within the filter casing 55, in which is packed a quantity of carbid ashes 60, interposed between layers of absorbent cotton 61 and 62, and arranged to arrest the entrained moisture carried by the gas which is filtered therethrough in its passage from the carbid receptacle, to the nozzle 54.

The bar 57 protects the mouth of the tube from being closed by the cap 26, which might be uplifted against the tension of the spring 30, by the expansion of the carbid, inclosed therein. The gas passage 38 which is controlled by the valve 33, is arranged to open communication between the gas chamber 43, and the atmosphere when the valve plug 34 is turned to shut off the supply of water to the carbid, and thus affords a free outlet from the generator for any "after generation" of gas, and consequently the flame is extinguished contemporaneously with the closing of said valve, and is thereby positively controlled.

It may be noted that although I have shown in Fig. I, brackets arranged to support the dome shaped cap 26, other means for supporting the cap may be employed, as for instance as shown in Fig. VIII, the cap 65, is arranged to extend to the floor of the carbid receptacle and is provided with deep notches 66, cut in its lower edges to permit the free passage of water into contact with the carbid contained therein.

As shown in Fig. IX, the condenser may be included within the water receptacle 70, and comprise the bottom wall 71, which slopes downwardly to the gas tube 72; the elbow nozzle 73, being in threaded engagement with the cap 74, which is in threaded gas tight relation with the threaded collar 75, in the top wall of the water receptacle 70.

As shown in Fig. X, the cap 80, comprises the elbow nozzle 81, and a depending tubular extension 82, embracing the filtering material 83. Said cap is provided with the shield 85, secured thereto in registry with its gas passage way to prevent the filtering material clogging the entrance of said passage way.

I do not desire to limit myself to the precise details of construction and arrangement hereinafter described, as it is obvious that various modifications may be made therein without departing from the essential features of my invention, as defined in the following claims.

I claim:—

1. The combination with an acetylene gas generator comprising a gas chamber, inclosing a removable cap, and, a water receptacle having a central tube leading to said chamber; of a valve casing inclosed by said water receptacle, having an air passage leading from said central tube to the atmosphere, and a water passage, at right angles to said air passage and leading from said water receptacle to said chamber; a rotary valve plug fitted in said casing, having separate passages for air and water extending transversely through said plug parallel with each other; an axial screw threaded opening from said water passage to the end of said plug; a screw threaded bushing fitted in said opening and having a flange overlapping said valve casing, retaining said plug in proper relation therewith; said bushing having an axial aperture leading from said water passage to said gas chamber; a reciprocatory plunger extending axially through said bushing aperture, restricting the area thereof, and supported by said cap; means, on said plunger, preventing its removal from said bushing; an axial stem on said valve plug in screw threaded engagement therewith; and, a screw threaded stop pin connecting said stem and plug and projecting exterior to the latter within a recess in said casing and thereby limiting the range of movement of said plug in said casing, substantially as set forth.

2. The combination with an acetylene gas generator comprising a gas chamber and a water receptacle having a tube leading to said chamber; of a valve casing inclosed by said water receptacle, having an air passage leading from said tube to the atmosphere, and a water passage, at right angles to said air passage and leading from said water receptacle to said chamber; a rotary valve plug fitted in said casing, having separate passages for air and water, extending transversely through said plug parallel with each other; an axial screw threaded opening from said water passage to the end of said plug; a screw threaded bushing fitted in said opening and having a flange overlapping said valve casing, retaining said plug in proper relation therewith; said bushing having an axial aperture leading from said water passage to said gas chamber; a reciprocatory plunger extending axially through said bushing aperture, restricting the area thereof; means, on said plunger, preventing its removal from said bushing; an axial stem on said valve plug in screw threaded engagement therewith; and, a screw threaded stop pin connecting said stem and plug and projecting exterior to the latter within a recess in said casing and thereby limiting the range of movement of said plug in said casing, substantially as set forth.

3. The combination with an acetylene gas generator comprising a gas chamber and a water receptacle; of a valve casing having an air passage leading from said chamber to the atmosphere, and a water passage leading from said water receptacle to said chamber; a rotary valve plug fitted in said casing having separate passages for air and water, extending transversely through said plug; an axial opening from said water passage to the end of said plug; a bushing fitted in said opening and having a flange overlapping said valve casing, retaining said plug in proper relation therewith; said bushing having an axial aperture leading from said water passage to said gas chamber; a reciprocatory plunger extending axially through said bushing aperture, restricting the area thereof; and means, on said plunger, preventing its removal from said bushing, substantially as set forth.

4. The combination with an acetylene gas generator comprising a gas chamber and a water receptacle; of a valve casing having an air passage leading from said chamber to the atmosphere and a water passage leading from said water receptacle to said chamber; a rotary plug, fitted in said casing, having separate passages for air and water, whereby said passages may be opened and closed in alternation; an axial opening from said water passage to the end of said plug; a bushing fitted in said opening and having a flange overlapping said valve casing retaining said plug in proper relation therewith; said bushing having an axial aperture leading from said water passage to said gas chamber; a reciprocatory plunger extending axially through said bushing aperture, restricting the area thereof; and, means on said plunger preventing its removal from said bushing, substantially as set forth.

5. The combination with an acetylene gas generator comprising a gas chamber and a water receptacle; of a valve casing having an air passage leading from said chamber to the atmosphere, and a water passage leading from said water receptacle to said chamber; a rotary plug, fitted in said casing, having separate passages for air and water, whereby said passages may be opened and closed in alternation; an axial opening from said water passage to the end of said plug; a removable bushing fitted in said opening and having an axial aperture leading from said water passage to said gas chamber; a reciprocatory plunger extending axially through said bushing aperture, restricting the area thereof; and, means on said plunger preventing its removal from said bushing, substantially as set forth.

6. The combination with an acetylene gas generator comprising a gas chamber and a water receptacle; of a valve casing having an air passage leading from said chamber to the atmosphere and a water passage leading from said water receptacle to said chamber; of a rotary plug, fitted in said casing, having separate passages for air and water, whereby said passages may be opened and closed in alternation; an axial opening from said water passage to the end of said plug; a removable bushing fitted in said opening and having an axial aperture leading from said water passage to said gas chamber; a reciprocatory plunger extending axially through said bushing aperture, restricting the area thereof; and, means distinct from said bushing supporting said plunger therein, substantially as set forth.

7. The combination with a valve casing comprising a seat for a rotary valve plug and a passage leading thereto; of a plug fitted in said casing, having a passage extending transversely with respect to its axis, adapted to register with the passage in said casing; an axial opening from said passage to the end of said plug; a removable bushing fitted in said opening and having an axial aperture; and, a reciprocatory plunger extending axially through said bushing aperture; restricting the area thereof, substantially as set forth.

8. The combination with a valve casing comprising a seat for a rotary valve plug and a passage leading thereto; of a plug fitted in said casing having a passage extending transversely with respect to its axis, adapted to register with the passage in said casing; an axial opening from said passage to the end of said plug; and, a reciprocatory plunger carried by said plug, restricting the area of said opening, substantially as set forth.

In testimony whereof, I have hereunto signed my name at Philadelphia, Pennsylvania, this seventh day of January, 1907.

EDWIN M ROSENBLUTH.

Witnesses:
ARTHUR E PAIGE,
ANNA F GETZFREAD.